(12) United States Patent
Ernst et al.

(10) Patent No.: US 11,698,563 B2
(45) Date of Patent: Jul. 11, 2023

(54) CHOLESTERIC LIQUID CRYSTAL WRITING DEVICE WITH STYLUS ERASE

(71) Applicant: Kent Displays, Inc., Kent, OH (US)

(72) Inventors: Todd Ernst, Kent, OH (US); Nathan Hirt, Kent, OH (US); Bryan Owen, Kent, OH (US); Clinton Braganza, Kent, OH (US); Hunter Morris, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 48 days.

(21) Appl. No.: 17/380,812

(22) Filed: Jul. 20, 2021

(65) Prior Publication Data

US 2023/0027561 A1    Jan. 26, 2023

(51) Int. Cl.
 G02F 1/137      (2006.01)
 G02F 1/1333     (2006.01)
 G06F 3/0354     (2013.01)
 G02F 1/1339     (2006.01)

(52) U.S. Cl.
 CPC ...... *G02F 1/13718* (2013.01); *G02F 1/13338* (2013.01); *G02F 1/13392* (2013.01); *G02F 1/133305* (2013.01); *G06F 3/03545* (2013.01)

(58) Field of Classification Search
 CPC combination set(s) only.
 See application file for complete search history.

(56) References Cited

U.S. PATENT DOCUMENTS

| | | | |
|---|---|---|---|
| 5,493,430 A | 2/1996 | Lu et al. | |
| 5,596,260 A * | 1/1997 | Moravec | G01R 31/367 324/426 |
| 6,104,448 A | 8/2000 | Doane et al. | |
| 8,228,301 B2 * | 7/2012 | Schneider | G06F 3/0412 345/173 |
| 8,947,604 B2 | 2/2015 | Pishnyak | |
| 9,116,379 B2 | 8/2015 | Braganza et al. | |
| 9,235,075 B2 | 1/2016 | Montbach et al. | |
| 9,651,813 B2 | 5/2017 | Morris et al. | |
| 9,927,672 B2 | 3/2018 | Braganza et al. | |
| 10,101,897 B1 * | 10/2018 | Buckley | G06F 3/03545 |
| 10,558,065 B2 | 2/2020 | Marhefka | |
| 10,908,708 B1 * | 2/2021 | Menendez | G06F 3/0346 |
| 11,262,635 B1 * | 3/2022 | Daniels | G02F 1/13306 |
| 2005/0264472 A1 * | 12/2005 | Rast | G09G 3/14 345/30 |
| 2009/0096942 A1 * | 4/2009 | Schneider | G02F 1/13338 349/12 |

(Continued)

OTHER PUBLICATIONS

U.S. Appl. No. 17/321,792, filed May 17, 2021.

*Primary Examiner* — Van N Chow
(74) *Attorney, Agent, or Firm* — Serbinowski PLLC (57) ABSTRACT

A liquid crystal writing device is erased by a stylus. The liquid crystal writing device includes a liquid crystal layer including cholesteric liquid crystal material. A user applies pressure to a flexible substrate that changes reflectivity of the cholesteric liquid crystal material to form images on the liquid crystal writing device. The liquid crystal layer is disposed between electrically conductive layers. Writing device terminals are electrically conductive and connected to the electrically conductive layers. The stylus includes stylus electronics adapted to apply an erase voltage or erase voltage waveform to the writing device terminals.

23 Claims, 11 Drawing Sheets (56) References Cited

U.S. PATENT DOCUMENTS

| | | | |
|---|---|---|---|
| 2011/0162894 A1* | 7/2011 | Weber | G06F 3/03545 178/19.03 |
| 2013/0342488 A1* | 12/2013 | Schneider | B43L 1/00 345/173 |
| 2014/0043547 A1* | 2/2014 | Marhefka | G06F 3/038 349/12 |
| 2014/0176495 A1* | 6/2014 | Vlasov | G06F 3/0441 345/174 |
| 2015/0124178 A1* | 5/2015 | Khan | G06F 3/0321 349/12 |
| 2019/0027674 A1* | 1/2019 | Zhang | G06F 3/041 |

* cited by examiner

CHOLESTERIC LIQUID CRYSTAL WRITING DEVICE WITH STYLUS ERASE

TECHNICAL FIELD

This disclosure relates generally to liquid crystal writing devices, and in particular, to cholesteric liquid crystal pressure sensitive writing devices.

BACKGROUND

In 2010, the Boogie Board® pressure sensitive cholesteric liquid crystal writing device, also referred to as an eWriter, of Kent Displays Inc. appeared on the market. The slight pressure of a pointed stylus or the fingernail can be used to write or trace an image on the surface of the writing device as described in U.S. Pat. Nos. 6,104,448 and 9,116,379, both patents being incorporated herein by reference. In a cholesteric liquid crystal writing device, the liquid crystal is sandwiched between two substrates that are separated by a particular cell gap. The upper substrate is flexible and the bottom substrate is opaque, semitransparent or possibly transparent with an underlying coating or layer that is opaque or semitransparent serving as a background. Within the cell gap is a bistable cholesteric liquid crystal layer which can exhibit two textures, an essentially transparent (focal conic) texture and a color reflective (planar) texture. The spacing of the cell gap is usually influenced by using plastic or glass spacers that are either cylindrical or spherical in shape. Spacers are also used to control pressure sensitivity as described in U.S. Pat. No. 8,947,604. In its normal mode of operation, one presses on the top substrate with a pointed stylus or fingernail to change the liquid crystal optical texture from the focal conic transparent texture to the brilliant, reflective color planar texture at the location of the stylus. The reflective color contrasts well with the opaque or semitransparent color below the liquid crystal layer. An image traced by the stylus or fingernail will remain on the eWriter indefinitely without application of a voltage until erased. Erasure is accomplished with the eWriter cleared by applying voltage pulses to an upper transparent electrically conductive layer and a lower optionally transparent electrically conducting layer on the inner surfaces of the substrates that drives the cholesteric liquid crystal from its color reflective state back to its focal conic substantially transparent state. Various pulse sequences have been found to erase the image. Usually those pulse sequences involve pulses of sufficient voltage to first drive the material to the homeotropic state that untwists and thereby removes the characteristic twisted cholesteric structure of the liquid crystal. This further completely clears the image before driving the material to the focal conic texture. The above-described principle is disclosed in more detail in U.S. Pat. Nos. 6,104,448 and 10,558,065 which are incorporated herein by reference.

As disclosed in U.S. Pat. No. 5,493,430, which is incorporated herein by reference, the color of the background additively mixes with the color reflected by the cholesteric liquid crystal to present a different color than that of the cholesteric liquid crystal. There may be multiple colors on the background and those colors may be patterned as described in U.S. Pat. No. 9,235,075, which is incorporated herein by reference. The reflective color from the liquid crystal layer may also be patterned as described in U.S. Pat. No. 9,927,672.

Figure 1:
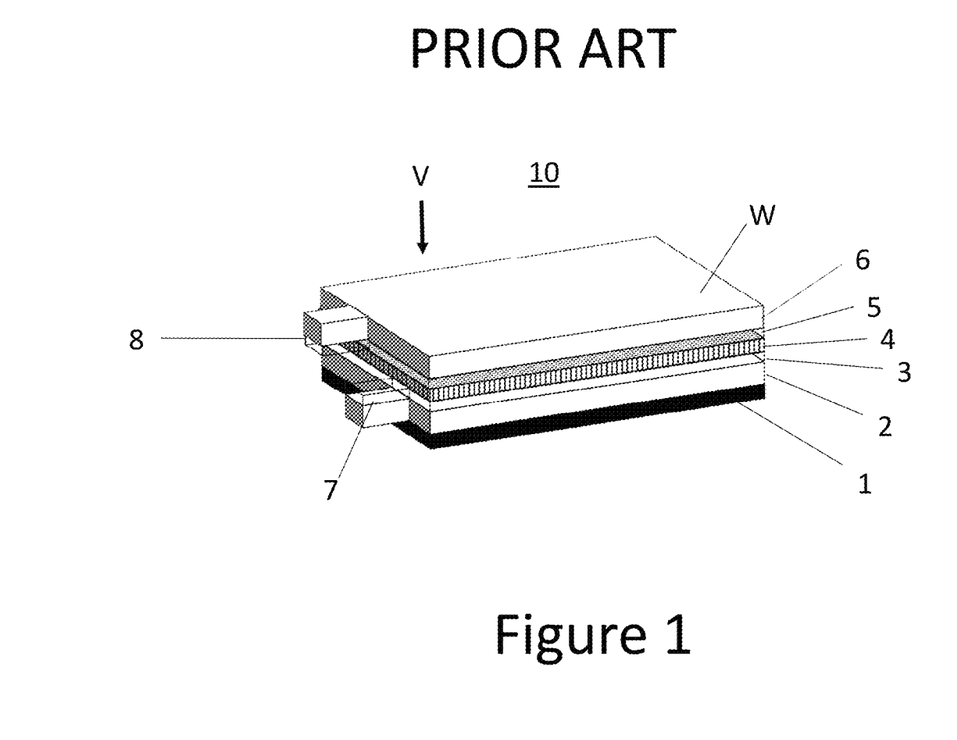
FIG. 1: Illustration of components of a cholesteric liquid crystal writing element of the Prior Art.

PRIOR ART FIG. 1 illustrates the components of a cholesteric liquid crystal writing element 10. Referring to FIG. 1, a light absorbing coating 1 is placed on the lower transparent polymer substrate 2, which is coated on its other surface with an optionally transparent electrically conductive layer 3. Coating 1 can also be patterned as described in U.S. Pat. No. 9,235,075. The remainder of the pressure sensitive liquid crystal device includes a liquid crystal layer 4 including a cured dispersion of cholesteric liquid crystal and polymer, and spacers, and a transparent upper substrate 6 coated on an inner surface with a transparent electrically conductive layer 5. The side of the upper substrate 6 not coated by the conductor 5 forms a writing surface W proximal to a viewer or user V of the device (the viewer V looking in a general direction of the arrow). The lower and upper substrates with conductors are extended to create the bottom ledge 7 and top ledge 8. The transparent conductive layers 3 and 5 are exposed on the ledges 7 and 8, respectively, for connecting to drive electronics so that a voltage or voltage pulses may be applied across the electrically conductive layers 3 and 5 of a magnitude and pulse width appropriate to clear or erase an image.

Figure 2:
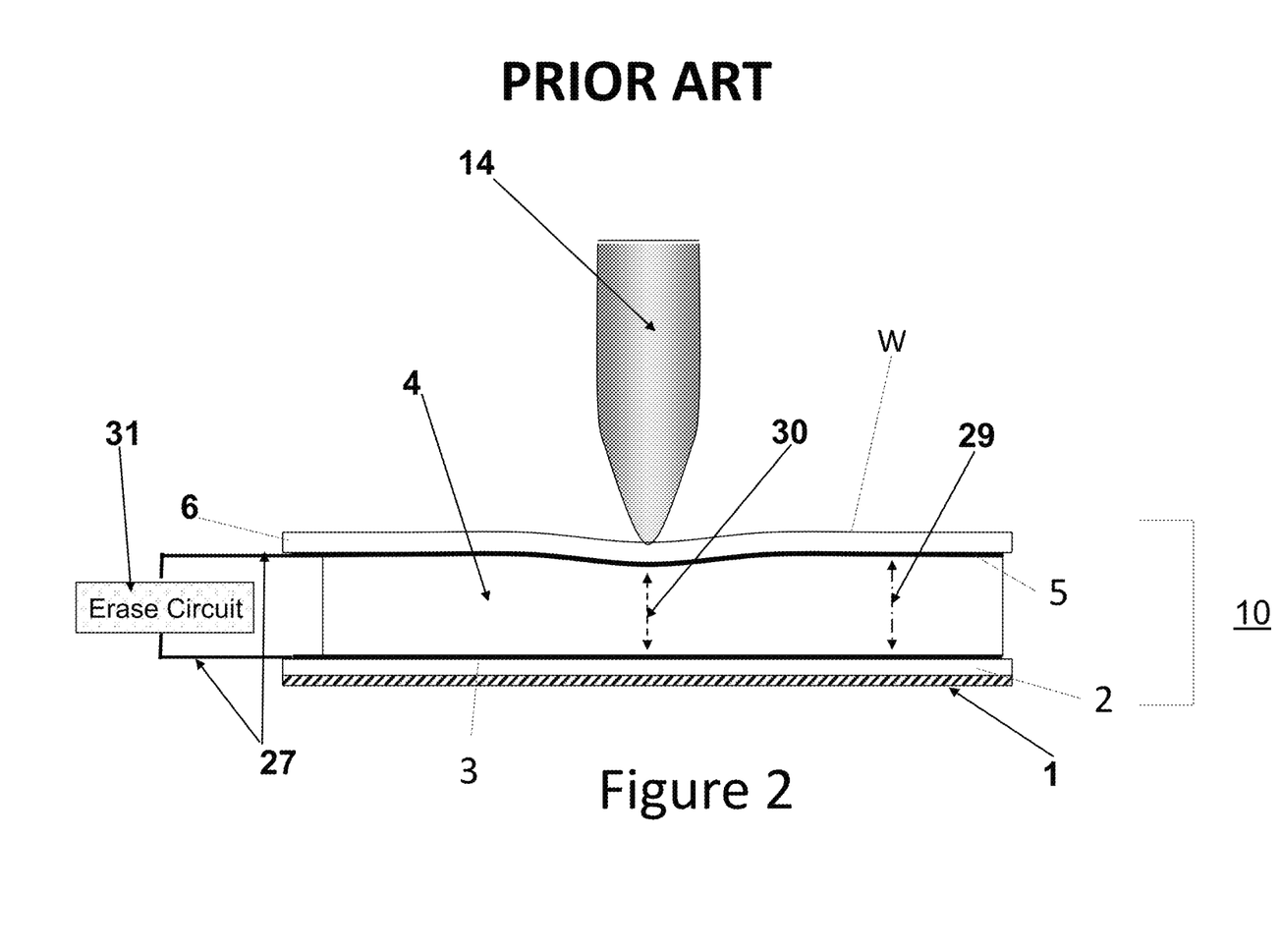
FIG. 2: Illustration of a side view of a Boogie Board® liquid crystal writing device of the Prior Art.

FIG. 2 shows an illustration of a commercially available Boogie Board® writing device showing the liquid crystal layer 4 with a region of unreduced cell gap 29 and reduced cell gap 30 due to the pressure from a stylus 14, which is a pointed untethered object. The conducting electrodes 3 and 5 on ledges 7 and 8 respectively are connected with electrical interconnects 27 to electronic erase circuitry 31 that provides suitable voltages to the conducting electrodes 3 and 5, usually in the form of voltage pulses to erase and clear the writing device for a new image. Pressure from the stylus 14 is applied to create images.

U.S. Pat. No. 9,651,813 discloses another version of a writing device in which the erase circuitry is removed from the cholesteric liquid crystal writing device. Termed liquid crystal paper, the patent discloses two separate electronic devices in which the liquid crystal paper must be inserted and suitably positioned for an electrical connection to erase an image. An advantage of liquid crystal paper is that it can have properties similar to normal writing paper but, unlike normal paper, it is not discarded after use; it can be cleared and reused many times over. One uses liquid crystal paper in the same way as normal paper for handwriting or drawing pictures. An untethered, pointed stylus is used to write on the liquid crystal paper but with the advantage that it does not have to be a pencil or pen but only a pointed object, which can be ones fingernail. Like normal paper, liquid crystal paper is placed on a hard surface for writing. An inconvenience of the prior art liquid crystal paper is that it needs to be picked up and moved to the erasing device and electrical contact made to erase it.

Prior art falls short of mimicking pencil on paper in that the hand held stylus does not have the capacity to both write and clear or erase the writing device. When using a pencil on paper one is accustomed to writing with one end of the pencil and erasing with the other end. It would therefore be a convenient addition to the technology if the writing device stylus could do the same whereby the stylus could have a handheld erasing component on the end portion opposite the tip for erasing or clearing the writing device. It would be of further advantage if the erasing component could perform like a pencil in which images could be quickly and easily erased.

SUMMARY OF THE DISCLOSURE

Disclosed is a cholesteric liquid crystal writing device and stylus that are adapted for erasing in which the erasing electronics are part of the stylus itself. Similar to an ordinary pencil, the stylus has an erasing component (eraser) on its end portion opposite to the pointed end portion. One only has to turn the stylus over and make electrical contact with the erasing component to erase the writing device. In one example, smart electronics allow the stylus to detect when the stylus is in electrical contact with the writing device and to apply suitable voltage pulses to erase the device. The disclosed device brings the function of a cholesteric liquid crystal writing device closer to the function of a normal pencil on paper in that the stylus not only writes on the paper but is also used to erase it.

A first aspect of the disclosure features a stylus and a liquid crystal writing device erased by the stylus. The liquid crystal writing device comprises cholesteric liquid crystal material. A user applies pressure to a flexible surface that changes reflectivity of the cholesteric liquid crystal material to form images on the liquid crystal writing device. The liquid crystal layer is disposed between electrically conductive layers. Writing device terminals are electrically conductive and connected to the electrically conductive layers. The stylus comprises stylus electronics adapted to apply an erase voltage to the writing device terminals.

Referring to more specific features of the first aspect which are independent of one another unless otherwise indicated, in a first feature the stylus electronics are adapted to detect electrical contact with the writing device terminals and to automatically apply the erase voltage to the writing device terminals. This unique feature allows the stylus itself to apply the erasing voltages rather than requiring the user to additionally activate a switch. Another second feature further limits the first feature, wherein the stylus comprises a power source and the stylus electronics, and wherein an optional resistor connects between the writing device terminals. A third feature further limits the second feature, wherein the stylus comprises a writing tip.

Still further, a switch is disposed on the stylus, wherein the stylus electronics are adapted to apply the erase voltage to the writing device terminals when activated by the switch. In another feature the stylus comprises a push button that activates the switch when pressed. Yet another feature is that the stylus comprises a spring loaded stylus terminal that engages one of the writing device terminals, wherein the spring loaded stylus terminal activates the switch when the spring is compressed.

Another feature is that the cholesteric liquid crystal material comprises a dispersion of cholesteric liquid crystal and polymer, and includes spacers.

Another feature is that the erase voltage is an erase portion of a slow discharge waveform, and the stylus electronics are adapted to apply the erase portion of the slow discharge waveform to the writing device terminals. In another feature the liquid crystal writing device is adapted to apply a discharge portion of the slow discharge waveform so that the slow discharge waveform erases at least one of the images.

A further feature is that the erase voltage is an erase portion of the slow discharge waveform. The stylus electronics are adapted to apply the erase portion of the slow discharge waveform to the writing device terminals. A resistor having a resistance value is connected between the liquid crystal writing device terminals. In yet another feature, a product of the resistance value with effective capacitance of the liquid crystal layer, results in a discharge time of a value that results in erase of at least one of the images.

Another feature is that the erase voltage is an erase portion of the slow discharge waveform. The stylus electronics are adapted to apply the erase portion of the slow discharge waveform to the writing device terminals. An effective resistance of the liquid crystal layer results in discharge and erase of at least one of the images. In a further feature, a product of the effective resistance and effective capacitance of the liquid crystal layer results in a discharge time of a value that results in erase of at least one of the images.

In another feature, the erase voltage comprises an erase voltage waveform.

In another feature, the user applies pressure to the stylus which, without application of a voltage, changes reflectivity of the reflective liquid crystal material from a color reflective texture to a transparent texture to form the images on the writing device.

In yet another feature, the user applies pressure to the stylus that changes reflectivity of the reflective liquid crystal material from a transparent texture to a color reflective texture to form the images on the writing device.

In a second aspect of the disclosure that further limits the first aspect, the stylus comprises
  stylus terminals that are electrically conductive and are adapted to engage the writing device terminals, and
  wherein the stylus terminals include a first stylus terminal and a second stylus terminal that is spaced from the first stylus terminal.

Referring now to specific features of the second aspect, the first stylus terminal has a circular shape or has a shape of a section of a circle. In another feature the second stylus terminal includes a ring shape or has a shape of a section of a ring. In yet another feature the first stylus terminal includes a circular protuberance and the second stylus terminal includes a ring. The circular protuberance is located inside of the ring.

In a third aspect of the disclosure that further limits the first aspect, the stylus and liquid crystal writing device comprises
  a housing;
  wherein the liquid crystal layer and the electrically conductive layers are contained by the housing and the housing forms a frame around the flexible surface; and
  wherein the writing device terminals are disposed on an external face of the housing.

It will be appreciated by a person having ordinary skill in the art in view of this disclosure that in all aspects, the stylus can have a tip for improve writing performance or not. This is because the liquid crystal writing device can be written on with the simple pressure of any object, even a fingernail or, for that matter, any part of the stylus where local pressure can be applied to the liquid crystal device. If a tip is present it can control the width of the written line. It might be solid so as not to leave any material on the writing surface or it can dispense material such as ink, lead or marker on the writing surface.

A fourth aspect of the disclosure is generally directed to a stylus that erases a liquid crystal writing device, comprising
  a battery disposed inside the stylus;
  erase electronics disposed inside the stylus and powered by the battery, the erase electronics being adapted to produce an erase voltage;
  stylus terminals that are electrically conductive; and
  wherein the erase electronics are adapted to detect electrical contact with writing device terminals of the liquid crystal writing device and to automatically apply the erase voltage to the writing device terminals.

Referring to more specific features of the fourth aspect, the erase voltage is an erase portion of a slow discharge waveform, the stylus electronics are adapted to apply the erase portion of the slow discharge waveform to the writing device terminals.

Many additional features, advantages and a fuller understanding of the disclosure will be had from the accompanying drawings and the Detailed Description that follows. It should be understood that the above Summary of the Disclosure describes the subject matter of the disclosure in broad terms while the following Detailed Description describes the subject matter of the disclosure more narrowly and presents specific embodiments that should not be construed as necessary limitations of the broad subject matter of the disclosure.

DETAILED DESCRIPTION

Figure 3:
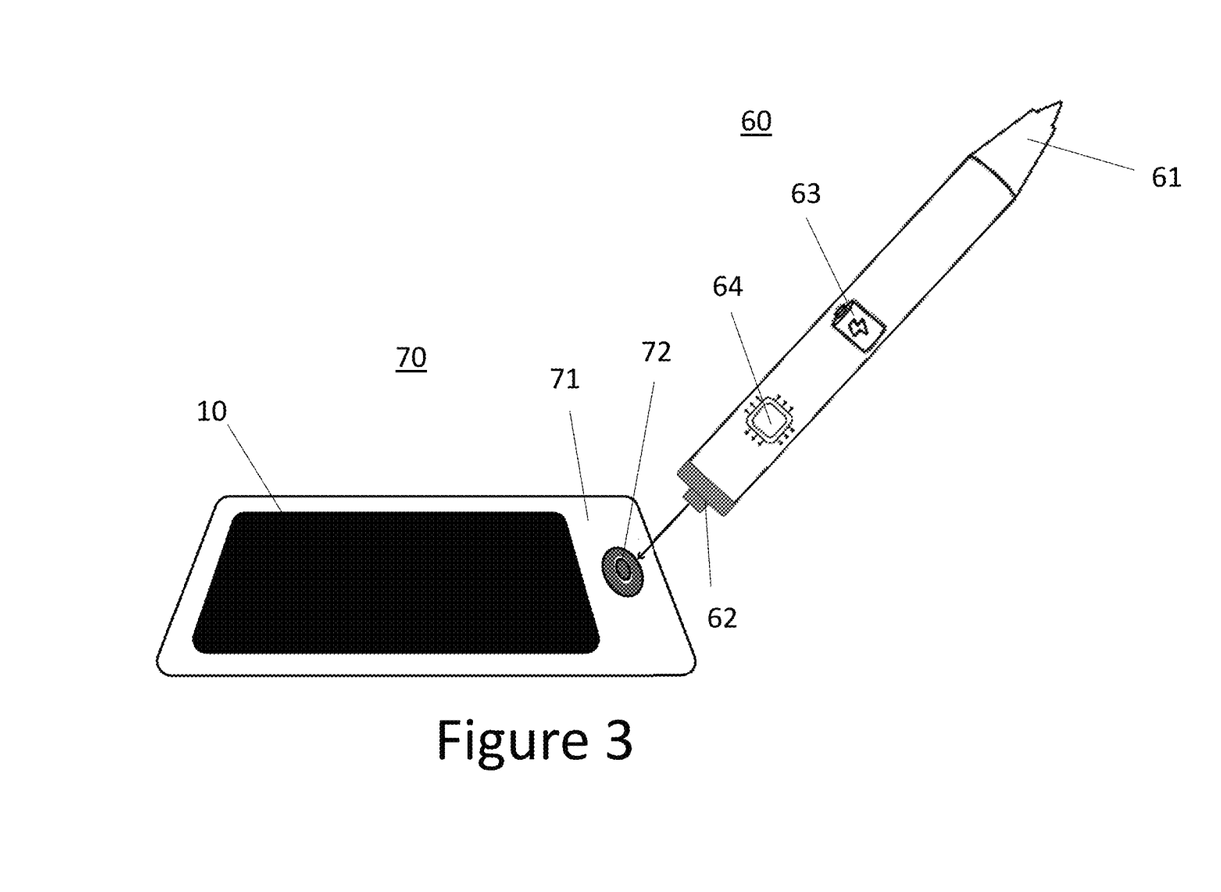
FIG. 3: Illustration of the disclosed concept of a stylus for erasing the writing device.

Turning now to a more specific description and referring to the drawings, the reference numbers of PRIOR ART FIG. 1 will be employed to represent the same parts throughout the several views. No description hereafter should be interpreted to be an admission of PRIOR ART unless clearly identified as such. Referring to FIG. 3 the disclosure features a stylus 60 and a liquid crystal writing device 70, including a liquid crystal writing element 10, erased by the stylus. The liquid crystal writing element 10 includes a liquid crystal layer 4 including cholesteric liquid crystal material. The cholesteric liquid crystal material includes cholesteric liquid crystal with optional spacers that influence the thickness of the liquid crystal layer as well as its sensitivity to pressure. In particular, the cholesteric liquid crystal material includes a dispersion of cholesteric liquid crystal and polymer to control the pressure sensitivity. The liquid crystal layer 4 is very thin on the order of 2 to 10 microns in thickness, for example. A flexible transparent substrate 6 has a writing surface W on which a user applies pressure that compresses the liquid crystal which in turn changes reflectivity of the cholesteric liquid crystal to form at least one image on the writing element 10. The reflectivity of the liquid crystal layer 4, may change from a light scattering (substantially transparent) texture to a color reflective texture (U.S. Pat. No. 6,104,448) or depending upon the cholesteric liquid crystal material and thickness of liquid crystal layer 4, the reflectivity can change from a color reflective texture to a transparent texture (U.S. patent application Ser. No. 17/321, 792, which is incorporated by reference). These changes in reflectivity can occur without the application of a voltage.

Figure 5:
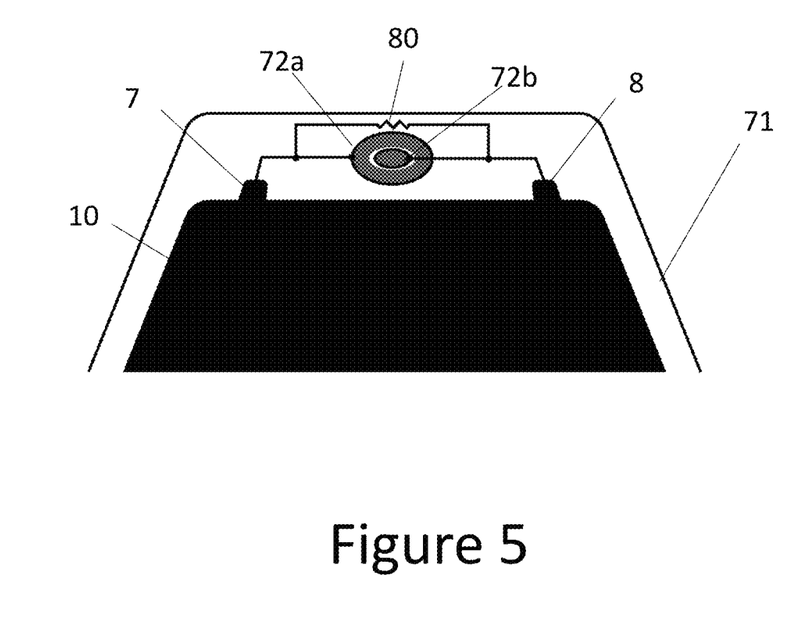
FIG. 5: Illustration of internal circuitry of the writing device.

While not wanting to be bound by theory, for example, the application of pressure causes the liquid crystal to flow which changes its reflectivity. Electrically conductive layers 3 and 5 are present between which the liquid crystal layer 4 is disposed. The front electrically conductive layer 5 and front substrate 6 are transparent while the back electrically conductive layer 3 and back substrate 2 may be transparent, opaque or semitransparent. It would be appreciated to a person having ordinary skill in the art in view of this disclosure that if a substrate or electrically conductive layer is indicated to be transparent or clear, this does not require a particular level of optical transparency only that the substrate or electrically conductive layer is see-through. If spacers are used, they are disposed between the electrically conductive layers. The electrically conductive layers 5, 3 are disposed between the front substrate 6 and the back substrate 2. It should be appreciated that the size of components of the liquid crystal writing element 10 shown in the drawings are not to scale. Also, the electrically conductive layer need not physically contact the liquid crystal layer or a substrate, i.e., an intervening layer or material could be optionally used between the substrate and the electrically conductive layer and between the electrically conductive layer and the liquid crystal layer. Front and back ledges 7, 8 are formed by the front substrate to expose the front electrically conductive layer and the back substrate to expose the back electrically conductive layer, respectively (FIG. 5). The writing device 70 includes a housing 71. Referring to FIG. 3, writing device terminals 72 are exposed from the housing 71 and are electrically conductive. The writing device terminals 72 are electrically connected with the electrically conductive layers 3 and 5 that are exposed on the ledges 7, 8 (FIG. 5). The stylus 60 includes stylus electronics 64 powered by a power source 63 to apply an erase voltage, for example, an erase voltage waveform, to its stylus terminals 62 and to the writing device terminals 72 that erases at least one image on the writing device.

The application of pressure by the stylus on the writing surface W enables the cholesteric liquid crystal material to be placed into a reflective state referred to as a planar texture in a local area approximating the size of the stylus and the distance the moving stylus travels. In one example, the liquid crystal material is erased into a generally transparent state referred to as a focal conic texture. An optional light absorbing layer 1 or light absorbing back surface at least partially absorbs light passing through the liquid crystal layer and can be opaque or semitransparent. The light reflective writing or marks are in the reflective planar texture while the background is in the generally transparent focal conic texture, the latter enabling the light absorbing layer or light absorbing back surface to be seen (in a direction of viewer V). The light absorbing layer or light absorbing back surface 1 provides contrast with the reflective writing on the liquid crystal writing element 10, enabling at least one image to be viewed on the liquid crystal element 10 in a direction of the viewer V as seen along the arrow in FIG. 1.

As shown in FIG. 3 the stylus 60 is not only used for writing on the writing element 10 but also for erasing the written image. The stylus 60 can function similar to a normal pencil with an optional writing tip 61 at one end of the stylus for applying pressure to a local or distinct region of the substrate and can affect the width of the written line. The stylus comprises stylus electronics 64, power source 63 and stylus terminals 62 on the opposite end of stylus. Tip 61 of the stylus comes to a point or other shape and applies pressure to the writing surface W of the liquid crystal writing element 10, thereby forming writing and at least one image on the liquid crystal writing element 10. None of the aspects of this disclosure requires the tip to leave matter on the writing surface, for example, pigment or ink, and in particular aspects of the disclosure the writing tip leaves no such printed matter during writing. The shape and dimensions of the tip affect the width of the written line. Writing with tip 61 is optional as, is known in the state of the art, one can write on writing element 10 with a fingernail or a pointed object that can apply local pressure to the surface of writing element 10 including any part of the stylus where local pressure can be applied. In the disclosed writing device, the stylus electronics 64 further contain a uniquely smart feature such that when the stylus terminals 62 are brought into electrical contact with writing device terminals 72, electrical contact will be automatically detected by the stylus electronics 64 and an erase voltage or an erase voltage waveform generated and applied to the electrically conductive layers of the liquid crystal writing element enabling the liquid crystal material to erase or otherwise clear writing and at least one image on the liquid crystal writing element 10. The writing device 70 can contain the flexible writing surface W and the writing element 10 mounted in a housing 71. For example, the housing 71 can form a frame around the writing element 10.

Alternatively, one may replace the smart electronic feature with a switch 65 that may be operated by a push button so that the user may apply the erase voltage waveform manually to erase or clear the writing of at least one image. One example of the stylus including the switch 65 with the push button and associated electronic circuitry is shown in FIGS. 10 and 11.

Figure 10:
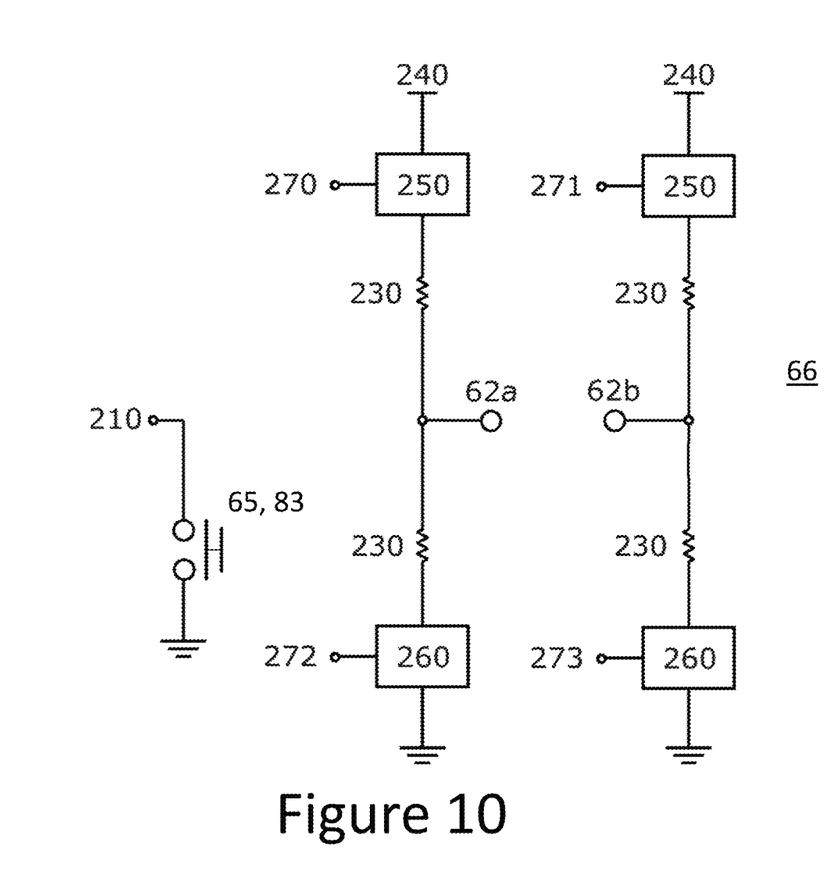
FIG. 10: Schematic illustration of the circuitry for manually erasing the image.
Figure 11:
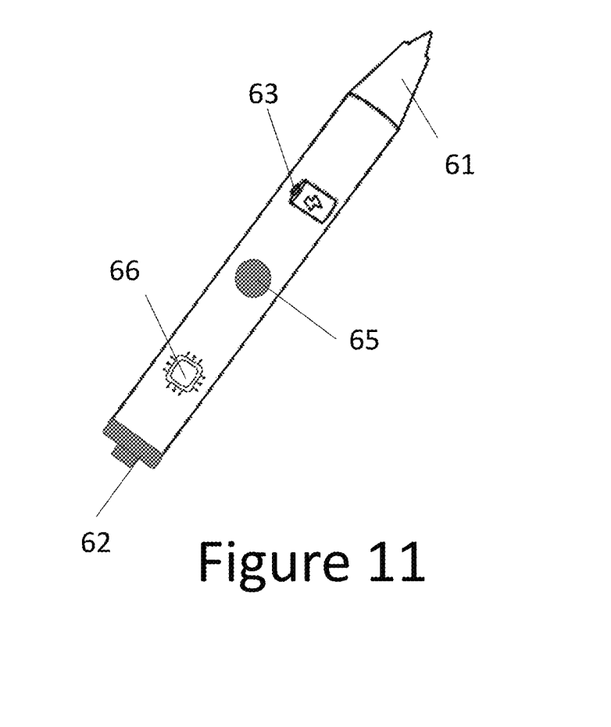
FIG. 11: Illustration of a stylus for erase with a push button activated switch.
Figure 12:
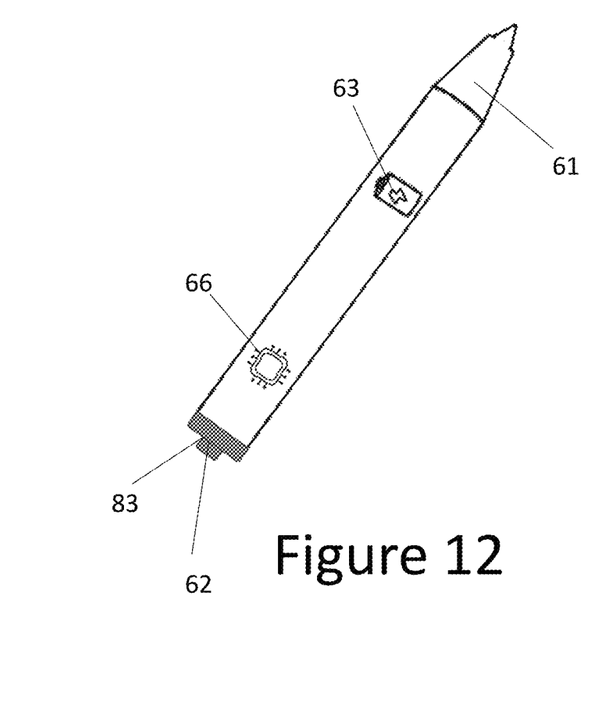
FIG. 12: Illustration of a stylus including a stylus terminal that is spring loaded for activating a switch.

In another variation shown in FIGS. 10 and 12, one may replace the smart electronic feature with a spring activated switch 83 and associated electronic circuitry. One of the stylus terminals 62 is spring loaded and when compressed, the spring activated switch 83 is activated so that pressing the stylus against the writing device terminals applies the erase voltage waveform to erase or clear the writing of at least one image.

The components of one embodiment of the stylus 60 are illustrated in FIG. 3, including a power source 63, which can be a battery or photoelectric or other device for generating power. A battery may or may not be accessible for replacement as the power drain is so small that it might serve the lifetime of the stylus. The unique stylus electronics 64 are described in detail later in this document. One or more of the stylus terminals 62 may be optionally biased by a spring (e.g., spring loaded) to ensure a better electrical contact with the writing device terminals 72 and provide a suitable feel of contact for the user. Optional tip 61 is mounted on and supported by the stylus. Tip 61 is usually in the form of a pointed object but may be of any other shape to provide local pressure for writing on the writing surface W of the flexible substrate 6 that causes reflectance of the cholesteric liquid crystal material to display an image on the writing surface W.

Figure 4A:
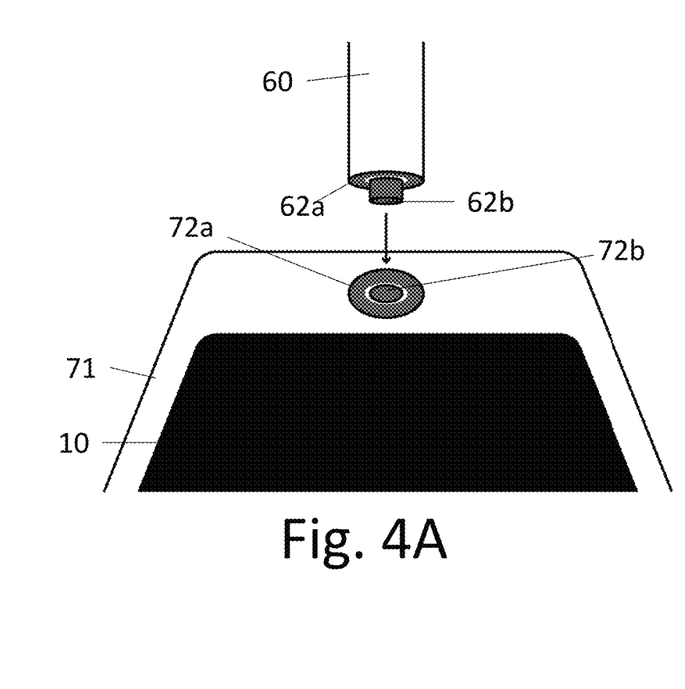
FIGS. 4A and 4B: Illustration of different example types of terminals on the stylus and writing device.
Figure 4B:
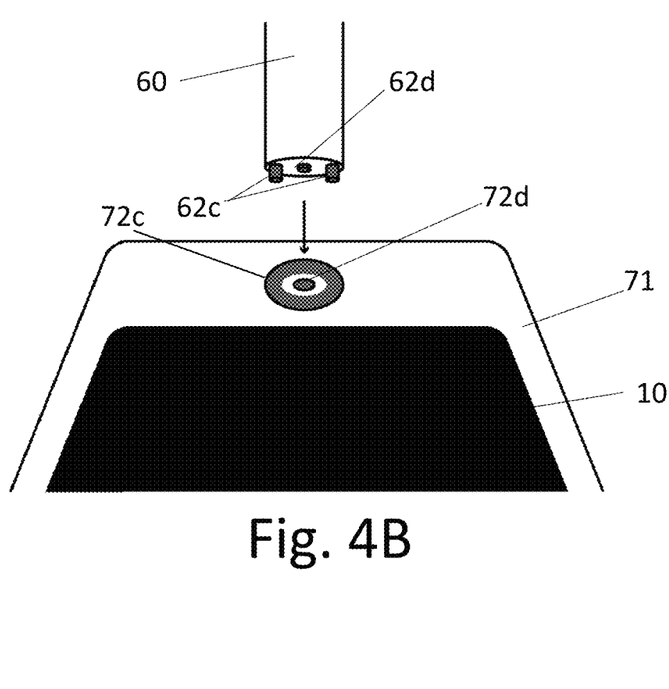

Electrical connection is made with a minimum of two stylus terminals 62. Two examples of stylus terminal configurations are illustrated in FIG. 4A and FIG. 4B, although other terminal configurations are possible. Stylus terminals 62a and 62b, in FIG. 4A are the terminal configurations used in the Example described later in which stylus terminal 62b is optionally spring loaded for improved electrical connection reliability with writing device terminal 72b. With stylus terminal 62b and writing device terminal 72b electrically engaged, stylus terminal 62a electrically connects with writing device terminal 72a to complete the circuit for erasing the writing device. A possible alternate configuration for the terminals on the stylus is shown in FIG. 4B where stylus terminals 62c are optionally spring loaded and stylus terminal 62d may or may not be spring loaded. In this configuration, the stylus terminals 62c electrically connect with writing device terminal 72c and the stylus terminal 62d electrically connects with writing device terminal 72d to complete the circuit for erasing writing on the writing surface of the writing element 10. It should be appreciated that the electrical contact or electrical engagement between terminals may or may not be physical contact. It should also be appreciated that use of the spring loaded terminals does not require use of the spring activated switch 83 that operates with a spring loaded stylus terminal.

Stylus terminals 62 and writing device terminals 72 may be in other shapes or combinations as would be appreciated by those of ordinary skill in the art in view of this disclosure. For example, the circular terminals on the stylus 60 or on the writing device housing 71 may be configured as half circles, or other segments of a circle. In addition, the ring shaped stylus terminal or writing device terminal may be replaced by one or more segments of a ring. The terminals may take on other shapes including, but not limited to, square, rectangular, triangular, hexagonal or other polygon, or portion thereof. The terminals can even take on more complex shapes. A person having ordinary skill in the art would appreciate in view of this disclosure that the number, shape, configuration and arrangement of the terminals, and the stylus shape and configuration, should not be used to unduly limit this disclosure or to support an assertion that one falls outside its scope. There may also be guides on the stylus and/or on the writing device housing (not shown in FIG. 4) to guide the stylus for making a reliable electrical connection. For example, the housing could include an annular ridge around the outer writing device terminal that enables the stylus's erasing end portion to be received so as to accurately align and engage the terminals.

FIG. 5 shows internal components of the writing device 70 contained by housing 71. The liquid crystal writing element 10 includes the components shown in FIG. 1. The housing 71 further supports the writing device terminals 72a, 72b with electrical connections to the electrically conducting layers 3 and 5 (not shown) on ledges 7 and 8 of the liquid crystal writing element 10 (all of which may be concealed inside the housing). As shown in FIG. 5, one portion of the circuit from the electrically conductive layer on the ledge 7 is located at or near writing device terminal 72a while another portion of the circuit from the electrically conductive layer on the ledge 8 is located at or near writing device terminal 72b. The writing device terminals 72a and 72b are spaced from each other so as to avoid shorting between them. In addition, a resistor 80 may optionally be connected across the writing device terminals 72a and 72b. The resistor 80 may be used for multiple purposes, including enabling the stylus electronics 64 of FIG. 3 to automatically detect the contact of the stylus terminals 62 to the writing device terminals 72 and in order to apply the erase voltage waveform without further action by the user. The connection may also be detected by using the capacitance of the display or additional connections. Other possible functions of the resistor 80 may include discharging the display as could for example result if the stylus is removed prematurely as is described in the next paragraph.

Figure 6:
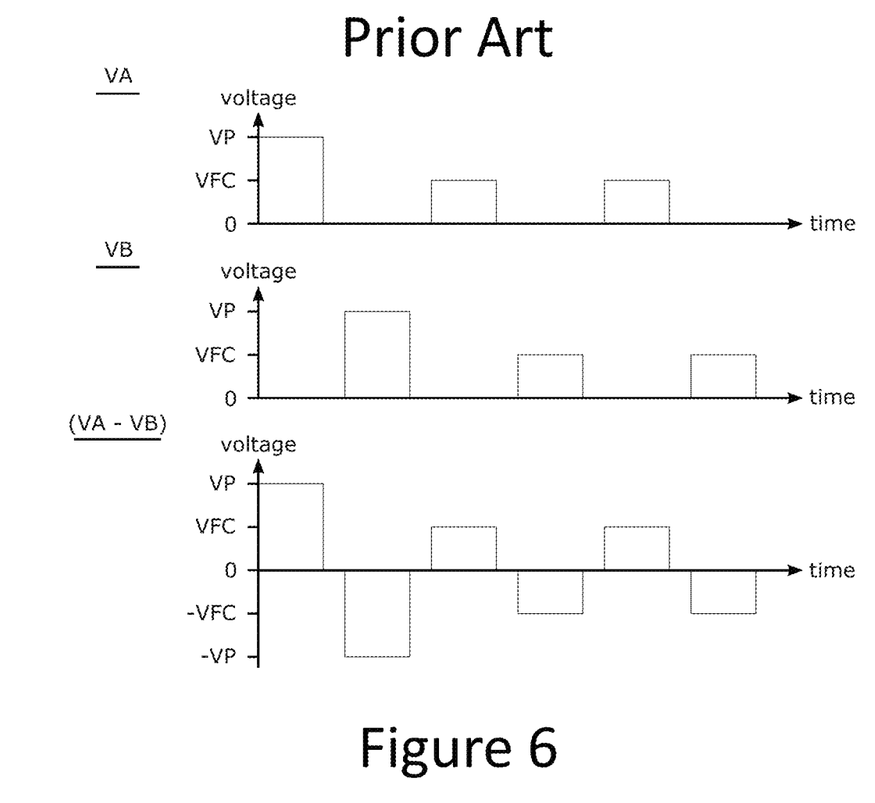
FIG. 6: Illustration of Prior Art electronic waveforms to erase the writing device.

Voltage waveforms for erasing writing devices are described in U.S. Pat. No. 10,558,065, which is incorporated herein by reference in its entirety. Any of the waveforms of the prior art may be used by the stylus. The most common waveform that may be used by the stylus is illustrated in FIG. 6, which shows two voltage waveforms VA and VB to be applied to writing device terminals 72a and 72b respectively, in order to erase the liquid crystal writing element 10 by driving it to the dark focal conic background. The drive waveforms, VA and VB, include 3 levels: 0V, VFC and VP. While each of these levels is zero or positive, the resultant voltage waveform seen across the display (VA-VB) is bipolar and consists of the levels 0V, ±VFC, and ±VP. Typical durations for the pulses (positive or negative) in the resultant waveform are 150 milliseconds (ms). The ±VP pulses drive the liquid crystal to the homeotropic state that removes the twisted cholesteric structure and clears away the previous image. As illustrated in FIG. 6, these pulses are followed by lower voltage level pulses VFC of alternating polarity that drive the writing device to the focal conic texture with the image erased. Pulses of alternating polarity are desired to avoid ionic conductivity damage to the writing device. The waveform may not require the voltage pulses VP if it is not desired to have a complete erase. However, the initial VP pulses are advantageously used for a better erase and to avoid ghosting.

Figure 7:
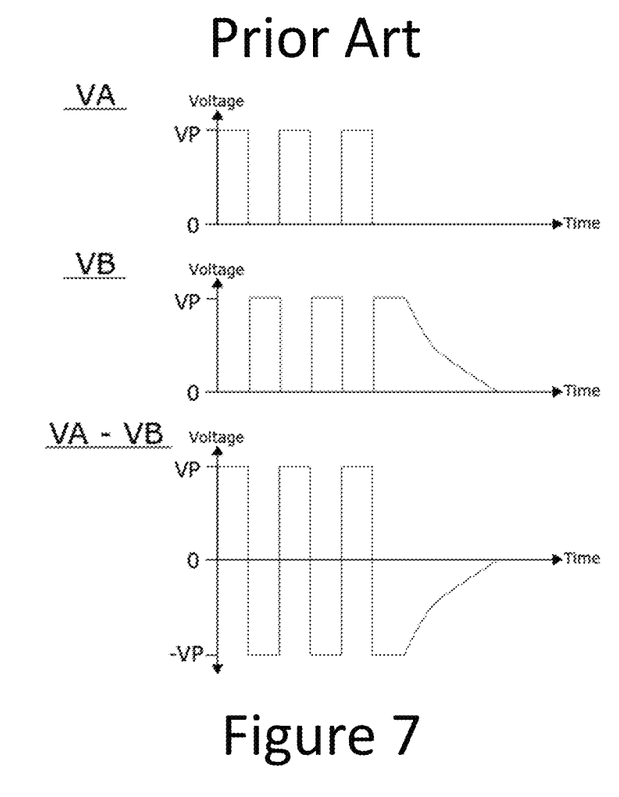
FIG. 7: Illustration of electronic waveform for slow discharge erase of the writing device in Example 1.

Another voltage waveform termed a slow discharge erase waveform is disclosed in U.S. Pat. No. 10,558,065, which is incorporated herein by reference, and applies a portion of the voltage waveform to drive the cholesteric liquid crystal to the homeotropic texture to erase the image, followed by a slow decay portion in which the charge on the writing device becomes discharged driving the writing device into the focal conic texture. Any of the erasing waveforms may be applied by the electronics of the stylus. Example 1 to be described later, uses the slow discharge erase waveform. That waveform is illustrated in FIG. 7, which shows two voltage waveforms VA and VB to be applied to writing device terminals 72a and 72b, respectively, to drive the writing device into the homeotropic texture and erase the previous image as described above. In order to leave the writing device in the dark focal conic texture and erase the writing device a slow discharge of the writing device follows the ±VP (voltage planar) pulses. This initializes the writing device for the next image. The slow discharge portion of the waveform drops the voltage from VP down to 0V. The initial polarity of the waveforms may be alternated to avoid ion migration in the liquid crystal material which can limit the lifetime of the writing device. The duration of the slow discharge can be governed by erase circuitry of the stylus or by the value RC where R is the effective resistance and C the effective capacitance C across the open terminals 72a and 72b of the writing device. In Example 1, the slow discharge portion is controlled by the value of resistor 80 of FIG. 5 and the effective capacitance of the liquid crystal layer of the writing surface element 10. The value of RC is a sufficient time to ensure that all areas of the writing device switch directly to the focal conic texture for display uniformity. The duration of the slow discharge portion is at least 10 ms, but can be as large as several seconds. Typical values are similar to that used in the Example described later. The resistor R need not be used if the resistivity or effective resistance of the liquid crystal writing element 10 is sufficiently low to discharge the capacitance of the writing device.

Figure 8:
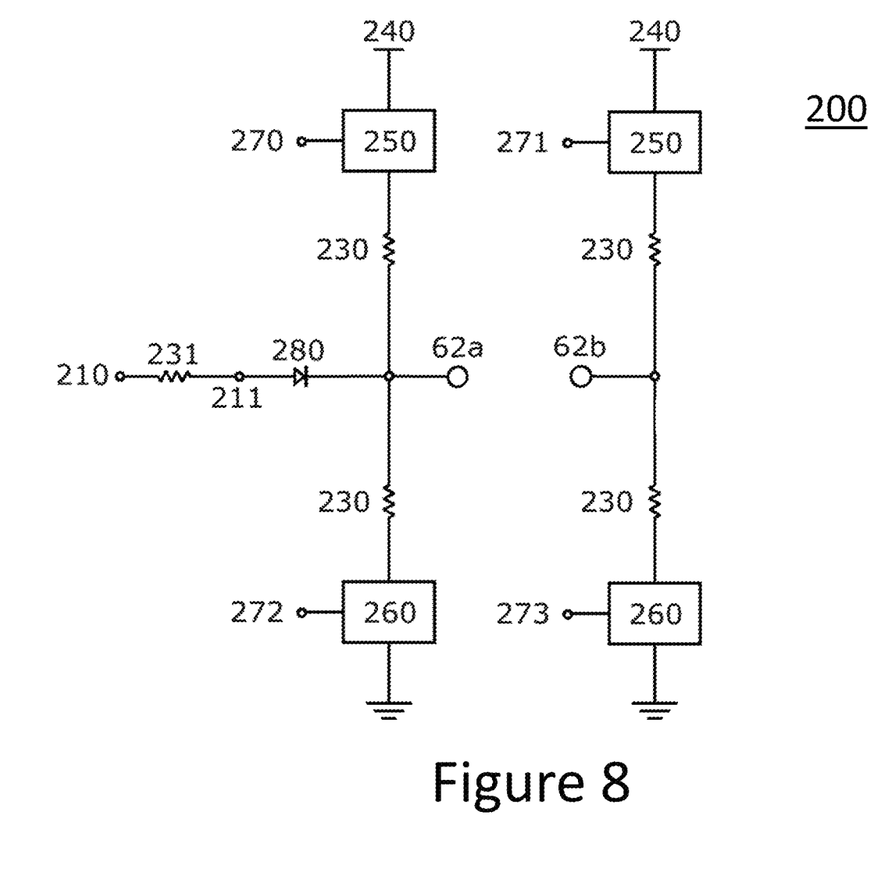
FIG. 8: Schematic illustration of the stylus detect and drive circuitry used to erase the writing device.

FIG. 8 provides a schematic representation of the detect and erase circuitry 200 of the stylus used to detect the presence of electrical connection with the writing device and drive the waveform of FIG. 7 to stylus terminals 62a and 62b. The drive circuitry is described first. High-side drivers 250 are provided to connect the stylus terminals 62a and 62b to voltage supply 240. Low-side drivers 260 are provided to connect the stylus terminals 62a and 62b to ground. Current limiting resistors 230 (optional) are included between stylus terminals 62a and 62b and drivers 250 and 260. Control signals 270 through 273 are sequenced to enable/disable the drivers to produce the required drive waveforms at stylus terminals 62a and 62b. In coordination, voltage supply 240 is configured to output VP. Implementations of voltage supply 240 and control logic for sequencing control signals 270 to 273 are well-known in the art, and together with the detect and drive circuitry 200 comprise the stylus electronics 64. The optional detect circuitry, described next, comprises resistor 231, diode 280, nodes 210 and 211.

In a particular aspect of the disclosure, the control logic of the stylus electronics 64 implements a low-power mode capable of detecting contact between the stylus terminals 62 and the writing device terminals 72. The erase waveform is applied automatically when contact is detected without requiring further action from the user, such as pressing a switch. The detect and drive circuitry 200 of FIG. 8 support this functionality. In the low power detection mode, control signal 273 is asserted to connect the stylus terminal 62b to ground through optional resistor 230 and a voltage, such as the logic power supply VDD for the stylus electronics, is applied to node 210. The voltage at node 211 is monitored for a logic low value, for instance using a digital I/O interrupt of a microcontroller. In the absence of a connection to the stylus terminals, node 211 will read as a logic high value due to the pull-up provided through resistor 231 to the voltage applied at node 210. When stylus terminals 62 are connected to writing device terminals 72, node 211 will be pulled momentarily to a logic low value by the diode 280 due to the discharged capacitance of the liquid crystal writing element 10. Resistor 80 also aids in this detection, pulling node 211 low by the voltage divider formed with resistor 231. After electrical contact between the stylus 60 and liquid crystal writing element 10 is detected, node 210 is set to ground while the erase waveform is generated. Diode 280 protects the control circuitry connected to nodes 210 and 211 from the high voltages applied to terminal 62a during the erase process.

Other aspects of the disclosure use manual erase whereby a switch, such as the push button switch 65 or the spring activated switch 83, could apply the voltage waveform to erase the image. In this case the detection circuit of FIG. 8, for example, could be removed and the switch 65 or spring activated switch 83 employed with circuitry illustrated in FIG. 10. The switch 65 could include a push button on the stylus as illustrated in FIG. 11 and erase electronics 66 as illustrated in FIG. 10. In another feature the spring activated switch 83 could be used with include a stylus terminal 62 that is spring loaded as illustrated in FIG. 12 and erase electronics 66 as illustrated in FIG. 10. Pushing the button 65 or the stylus terminal 62 that is spring loaded and closing the switch applies an erasing waveform to terminals 62 of the stylus and when terminals 62 are in electrical contact with terminals 72 of the writing devices the erasing waveform is applied to erase the image.

The disclosure will now provide an Example of particular features, which should not be used to unduly limit the claimed subject matter.

Example

As an example, a working stylus 60 of FIG. 3 was made with erasure stylus terminals illustrated as 62a and 62b of FIG. 4A for erasing a liquid crystal writing element 10 of FIG. 5. The central stylus terminal 62b was spring loaded to ensure good contact with the writing device terminals. The working stylus electronics included the detect and drive circuitry 200 of FIG. 8.

Figure 9:
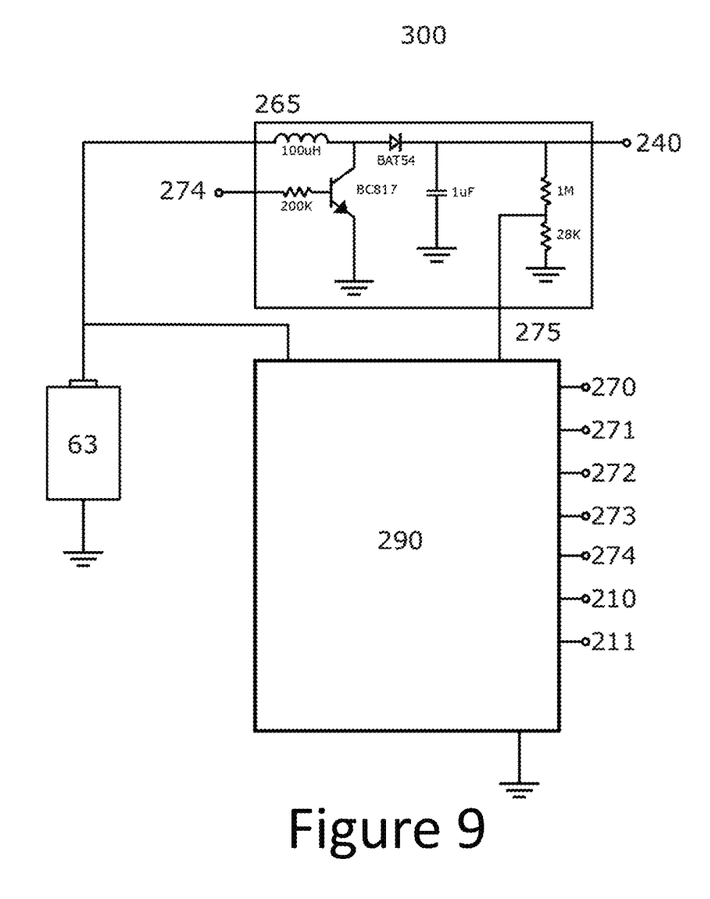
FIG. 9: Schematic illustration of the circuitry of Example 1.

The stylus electronics further included the specific circuitry 300 shown in FIG. 9, providing an implementation of voltage supply 240 and control logic as part of the stylus circuitry 64, as well as the power source 63. The microprocessor 290 of FIG. 9 was a Texas Instruments MSP430F200I and power source 63 consisted of two LR44 batteries connected in series for an output of 3V. The resistor 80 across the terminals of the writing element 10 had a resistance of 200 kilo ohms (kΩ). The microcontroller 290 performed the procedure discussed for FIG. 8 via control signals 270-273 and writing device detection signals 210 and 211. The microcontroller 290 additionally controlled the step-up converter 265 to generate a voltage of VP at voltage supply 240. The voltage supply 240 was sensed by microcontroller 290 via the signal 275. If the voltage at voltage supply 240 was less than the VP voltage then the microcontroller 290 provided a PWM signal to step-up converter input 274 until the voltage at voltage supply 240 was greater than or equal to VP.

A cholesteric liquid crystal writing device that could be erased with the stylus was fabricated by adapting a commercial Jot 8.5 Boogie Board® writing device of Kent Displays, Inc. In that adaptation, the erase electronics and erase button were removed and writing device terminals of the design illustrated as 72a and 72b of FIG. 5 were added in the area of the removed button. Writing device terminals 72a and 72b were connected to the electrically conductive layers or electrodes 3 and 5 on ledges 7 and 8, respectively, as illustrated in FIGS. 1 and 5. In order to be compatible with the stylus electronics of the prototype, a resistor, illustrated as 80 in FIG. 5, of value 200 kΩ was connected across stylus terminals 72a and 72b. The stylus was observed to erase the written image on the writing device when the stylus terminals were placed in contact with the writing device terminals. Furthermore, it was observed that the writing device could be fully erased even when the stylus was removed before erasure was fully complete, a unique property of the specific electronics and waveform selected for the example.

Many modifications and variations of the subject matter of the disclosure will be apparent to those of ordinary skill in the art. Therefore, it is to be understood that the subject matter of the disclosure can be practiced otherwise than has been specifically shown and described.

What is claimed is:

1. A stylus and liquid crystal writing device erased by the stylus, comprising
    a liquid crystal writing device comprising:
        a liquid crystal layer including cholesteric liquid crystal material,
        a flexible surface on which a user applies pressure that changes reflectivity of said cholesteric liquid crystal material to form images on said writing device,
        electrically conductive layers between which said liquid crystal layer is disposed,
        writing device terminals that are electrically conductive and connected to said electrically conductive layers; and
    a stylus comprising:
        stylus electronics that are part of said stylus, said stylus electronics including stylus terminals that are electrically conductive, wherein when said stylus terminals are made to electrically contact said writing device terminals said stylus electronics apply an erase voltage to said writing device terminals that erases at least one of the images formed on said writing device.

2. The stylus and liquid crystal writing device of claim 1 wherein said stylus electronics detect when said stylus terminals are made to have electrical contact with said writing device terminals and automatically apply said erase voltage to said writing device terminals.

3. The stylus and liquid crystal writing device of claim 2 wherein said stylus comprises a power source, and wherein an optional resistor connects between said writing device terminals.

4. A stylus and liquid crystal writing device of claim 3 wherein said stylus comprises a writing tip.

5. The stylus and liquid crystal writing device of claim 1, said stylus comprising a switch, wherein said stylus electronics apply said erase voltage to said writing device terminals when activated by said switch.

6. The stylus and liquid crystal writing device of claim 5 wherein said stylus comprises a push button that activates said switch when pressed.

7. The stylus and liquid crystal writing device of claim 5 wherein said stylus terminals comprise a spring loaded stylus terminal that engages one of said writing device terminals, wherein said spring loaded stylus terminal activates said switch when said spring is compressed.

8. The stylus and liquid crystal writing device of claim 1 wherein said cholesteric liquid crystal material comprises a dispersion of cholesteric liquid crystal and polymer, and includes spacers.

9. The stylus and liquid crystal writing device of claim 1 wherein said erase voltage is an erase portion of a slow discharge waveform, and said stylus electronics apply the erase portion of said slow discharge waveform to said writing device terminals.

10. The stylus and the liquid crystal writing device of claim 9 wherein said writing device is adapted to apply a discharge portion of said slow discharge waveform so that said slow discharge waveform erases at least one of the images.

11. The stylus and liquid crystal writing device of claim 9 wherein said liquid crystal writing device comprises a resistor having a resistance value and connected between said writing device terminals.

12. The stylus and liquid crystal writing device of claim 11 wherein a product of said resistance value with effective capacitance of said liquid crystal layer, results in a discharge time of a value that results in erase of at least one of said images.

13. The stylus and liquid crystal writing device of claim 9 wherein an effective resistance of said liquid crystal layer results in discharge and erase of at least one of said images.

14. The stylus and liquid crystal writing device of claim 13 wherein a product of said effective resistance and effective capacitance of said liquid crystal layer results in a discharge time of a value that results in erase of at least one of said images.

15. The stylus and liquid crystal writing device of claim 1, wherein said
    stylus terminals include a first stylus terminal and a second stylus terminal that is spaced from said first stylus terminal.

16. The stylus and liquid crystal writing device of claim 15 wherein said first stylus terminal has a circular shape or has a shape of a section of a circle.

17. The stylus and liquid crystal writing device of claim 15 wherein said second stylus terminal includes a ring shape or has a shape of a section of a ring.

18. The stylus and liquid crystal writing device of claim 15 wherein said first stylus terminal includes a circular protuberance and said second stylus terminal includes a ring, said circular protuberance being located inside of said ring.

19. The stylus and liquid crystal writing device of claim 1, comprising:
 a housing;
 wherein said liquid crystal layer and said electrically conductive layers are contained by said housing and said housing forms a frame around said flexible surface; and
 wherein said writing device terminals are disposed on an external face of said housing.

20. The stylus and liquid crystal writing device of claim 1 wherein said erase voltage comprises an erase voltage waveform.

21. A stylus that erases a liquid crystal writing device, comprising:
 a battery disposed inside said stylus;
 erase electronics disposed inside said stylus and powered by said battery, said erase electronics producing an erase voltage; and
 stylus terminals that are electrically conductive;
 wherein said erase electronics detect when said stylus terminals are made to have electrical contact with writing device terminals of the liquid crystal writing device and to automatically apply said erase voltage to the writing device terminals.

22. The stylus of claim 21 wherein said erase voltage is an erase portion of a slow discharge waveform, said stylus electronics are adapted to apply the erase portion of said slow discharge waveform to said writing device terminals.

23. The stylus and liquid crystal writing device of claim 19 wherein said stylus comprises a writing tip on one end of said stylus and said stylus terminals are located on an opposite end of said stylus.

\* \* \* \* \*